United States Patent

Itoga

(10) Patent No.: US 11,114,683 B2
(45) Date of Patent: Sep. 7, 2021

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventor: Michitaro Itoga, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 29 days.

(21) Appl. No.: 16/701,384

(22) Filed: Dec. 3, 2019

(65) Prior Publication Data

US 2020/0243884 A1    Jul. 30, 2020

(30) Foreign Application Priority Data

Jan. 28, 2019    (JP) .............................. JP2019-011985

(51) Int. Cl.
*H01M 8/04746* (2016.01)
*H01M 8/04858* (2016.01)

(52) U.S. Cl.
CPC ... *H01M 8/04776* (2013.01); *H01M 8/04932* (2013.01)

(58) Field of Classification Search
CPC .............. H01M 8/04776; H01M 8/04932
See application file for complete search history.

(56) References Cited

U.S. PATENT DOCUMENTS

| | | | |
|---|---|---|---|
| 6,255,008 B1* | 7/2001 | Iwase | B60L 58/30 429/9 |
| 2002/0006537 A1* | 1/2002 | Kobayashi | H01M 8/04716 429/414 |
| 2009/0317678 A1* | 12/2009 | Bono | H01M 8/04768 429/436 |
| 2010/0279193 A1* | 11/2010 | Yamagishi | B60L 58/33 429/444 |

FOREIGN PATENT DOCUMENTS

| | | |
|---|---|---|
| JP | 2007220614 A | 8/2007 |
| JP | 2011146165 A | 7/2011 |
| JP | 2011228076 A | 11/2011 |

* cited by examiner

*Primary Examiner* — Olatunji A Godo
(74) *Attorney, Agent, or Firm* — Dickinson Wright, PLLC (57) ABSTRACT

An FC (fuel cell) system includes: a compressor supplying air to a CE (cathode electrode) of FC; an OV (outlet valve) connected to a discharge port through which air is discharged from CE; an injector supplying hydrogen gas to an AE (anode electrode) of FC; a CP (circulation pump) provided in a circulation path that returns the hydrogen gas discharged from AE to AE; and a controller controlling power generation of FC. In a case of removing a component that allows air to enter CE when removed, before the component is removed, the controller executes a first step of opening OV, driving the compressor, and supplying air to CE, and a second step of driving CP to cause hydrogen gas that remains inside AE and the circulation path to be circulated in a state in which the hydrogen gas is not supplied to AE from the injector.

6 Claims, 5 Drawing Sheets

FUEL CELL SYSTEM AND METHOD OF CONTROLLING FUEL CELL SYSTEM

CROSS REFERENCE TO RELATED APPLICATIONS

This application is based upon and claims the benefit of priority from Japanese patent application No. 2019-011985, filed on Jan. 28, 2019, the disclosure of which is incorporated herein in its entirety by reference.

BACKGROUND

The present disclosure relates to a fuel cell system and a method of controlling the fuel cell system.

In recent years, solid polymer electrolyte type fuel cells have been focused on as fuel cells for automobiles. A solid polymer electrolyte type fuel cell includes a cell stack in which a number of unit cells are stacked. Each unit cell includes a Membrane/Electrode Assembly (MEA) in which a polymer electrolyte membrane is interposed between a pair of electrodes (a cathode electrode and an anode electrode) and a pair of separators between which the MEA is interposed. The fuel cell generates power through an oxidation-reduction reaction of air supplied via the separator on the side of the cathode electrode and hydrogen gas supplied via the separator on the side of the anode electrode.

Japanese Unexamined Patent Application Publication No. 2007-220614 discloses a method of short-circuiting, after a power generation test of a manufactured fuel cell is conducted, the positive electrode and the negative electrode of the fuel cell to reduce the voltage that remains in the fuel cell in order to ensure security.

SUMMARY

The present inventors have found the following problem regarding the fuel cell system.

Even when the positive electrode and the negative electrode of the fuel cell are short-circuited and the voltage that remains in the fuel cell is reduced as disclosed in Japanese Unexamined Patent Application Publication No. 2007-220614, excessive hydrogen remains in the anode electrode in the fuel cell.

Therefore, if air enters the cathode electrode of the fuel cell when a component is removed, it is possible that this air may react with hydrogen that remains inside the anode electrode of the fuel cell and power be generated, which may cause the voltage of the fuel cell to be increased again.

The present disclosure has been made in view of the aforementioned circumstances and provides a fuel cell system capable of preventing the voltage of the fuel cell from increasing again when the component is removed.

A fuel cell system according to the present disclosure is a fuel cell system including:

a fuel cell configured to generate power through a reaction of air supplied to a cathode electrode and hydrogen gas supplied to an anode electrode;

a compressor configured to supply air to the cathode electrode of the fuel cell;

an outlet valve connected to a discharge port through which air is discharged from the cathode electrode;

an injector configured to supply hydrogen gas to the anode electrode of the fuel cell;

a circulation pump provided in a circulation path that returns the hydrogen gas discharged from the anode electrode to the anode electrode; and a controller configured to control power generation of the fuel cell, in which in a case of removing a component that allows air to enter the cathode electrode when the component is removed, before the component is removed, the controller executes the following steps of:

a first step of opening the outlet valve, driving the compressor, and supplying air to the cathode electrode; and a second step of driving the circulation pump to cause hydrogen gas that remains inside the anode electrode and the circulation path to be circulated in a state in which the hydrogen gas is not supplied to the anode electrode from the injector.

In the fuel cell system according to the present disclosure, in a case of removing a component that allows air to enter the cathode electrode when the component is removed, before the component is removed, the controller executes the first step of opening the outlet valve, driving the compressor, and supplying air to the cathode electrode and the second step of driving the circulation pump to cause the hydrogen gas that remains inside the anode electrode and the circulation path to be circulated in a state in which the hydrogen gas is not supplied from the injector to the anode electrode. Accordingly, substantially all the hydrogen that remains inside the anode electrode of the fuel cell and the circulation path is consumed. Therefore, even when the component is removed and air enters the cathode electrode of the fuel cell, it is possible to prevent the voltage of the fuel cell from increasing again.

Execution of the second step may be started after a predetermined period of time has elapsed since the start of the execution of the first step. Accordingly, the peak value of the voltage of the fuel cell when the first step and the second step are executed can be reduced.

When the circulation pump is driven in the second step, the number of rotations of the compressor that is driven in the first step may be reduced. Accordingly, it is possible to level power consumption before and after the circulation pump is driven.

The fuel cell system may further include an exhaust valve configured to discharge hydrogen gas discharged from the anode electrode. When the second step is executed, inactive gas may be discharged via the exhaust valve while the inactive gas is being supplied to the anode electrode via the injector. Accordingly, it is possible to reduce a time during which hydrogen that remains inside the anode electrode of the fuel cell and the circulation path is consumed.

The fuel cell system may further include: a secondary cell configured to supply power to the compressor and the circulation pump; and a measurement device configured to measure a charge amount of the secondary cell, in which the controller may not execute the first step and the second step when the charge amount of the secondary cell measured by the measurement device is smaller than a predetermined reference value. Accordingly, it is possible to prevent the charge amount of the secondary cell from being excessively reduced.

A method of controlling a fuel cell system according to the present disclosure is a method of controlling a fuel cell system including:

a fuel cell configured to generate power through a reaction of air supplied to a cathode electrode and hydrogen gas supplied to an anode electrode;

a compressor configured to supply air to the cathode electrode of the fuel cell;

an outlet valve connected to a discharge port through which air is discharged from the cathode electrode;

an injector configured to supply hydrogen gas to the anode electrode of the fuel cell; and a circulation pump provided in a circulation path that returns the hydrogen gas discharged from the anode electrode to the anode electrode, in which the method includes executing, in a case of removing a component that allows air to enter the cathode electrode when the component is removed, before the component is removed, a first step of opening the outlet valve, driving the compressor, and supplying air to the cathode electrode; and a second step of driving the circulation pump to cause hydrogen gas that remains inside the anode electrode and the circulation path to be circulated in a state in which the hydrogen gas is not supplied to the anode electrode from the injector.

The method of controlling the fuel cell system according to the present disclosure includes, in a case of removing a component that allows air to enter the cathode electrode when the component is removed, before the component is removed, the first step of opening the outlet valve, driving the compressor, and supplying air to the cathode electrode and the second step of driving the circulation pump to cause the hydrogen gas that remains inside the anode electrode and the circulation path to be circulated in a state in which the hydrogen gas is not supplied from the injector to the anode electrode. Accordingly, substantially all the hydrogen that remains inside the anode electrode of the fuel cell and the circulation path is consumed. Accordingly, even when the component is removed and air enters the cathode electrode of the fuel cell, it is possible to prevent the voltage of the fuel cell from increasing again.

According to the present invention, it is possible to provide a fuel cell system capable of preventing the voltage of the fuel cell from increasing again when the component is removed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of the disclosure will be described in detail with reference to the accompanying drawings. However, the disclosure is not limited to the following embodiments. For the purpose of clear explanation, the following description and the drawings are appropriately simplified.

First Embodiment

Configuration of Fuel Cell System

Figure 1:
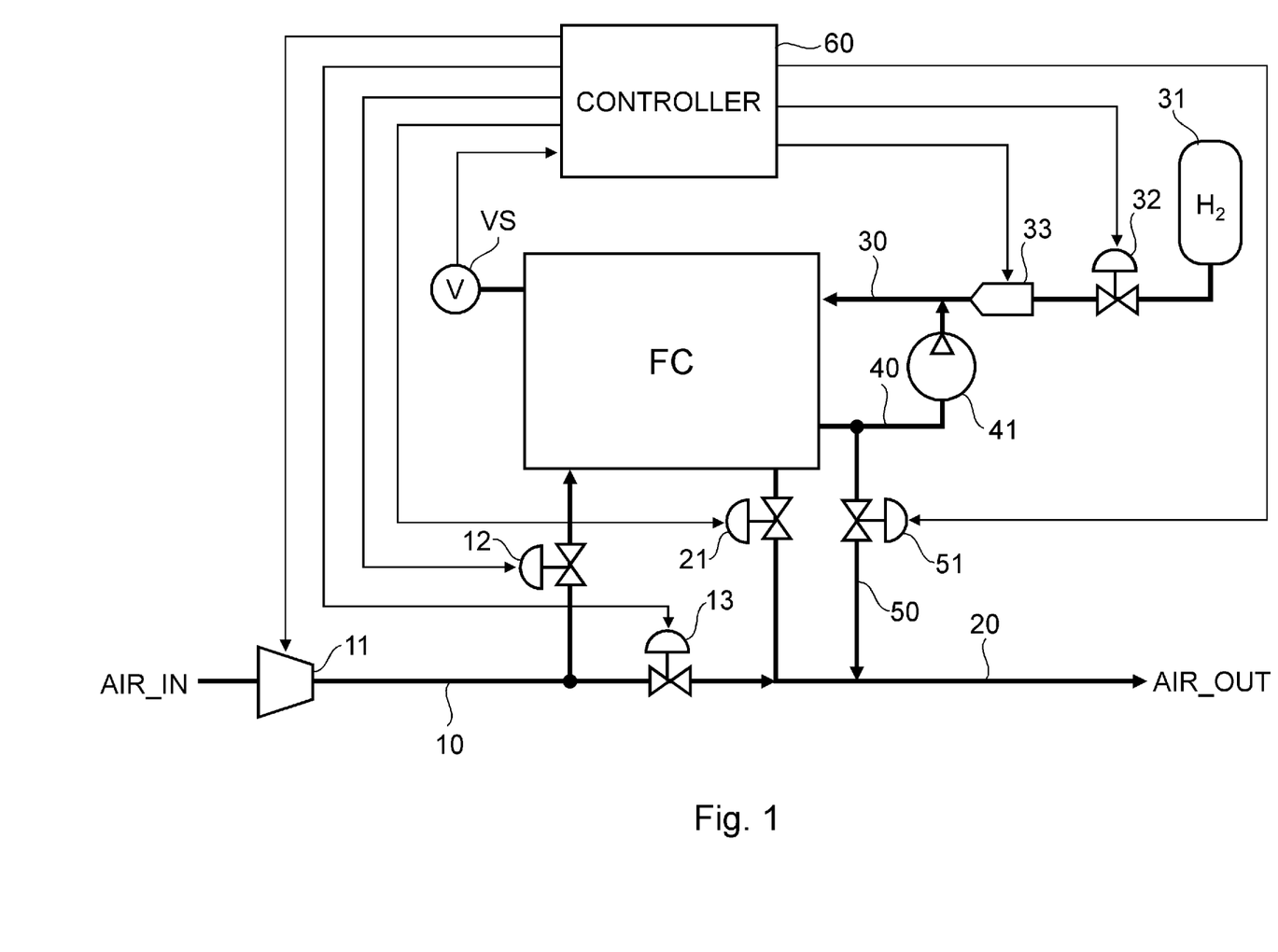
FIG. 1 is a configuration diagram of a fuel cell system according to a first embodiment.

First, with reference to FIG. 1, a configuration of a fuel cell system according to a first embodiment will be explained. FIG. 1 is a configuration diagram of the fuel cell system according to the first embodiment. As shown in FIG. 1, the fuel cell system according to the first embodiment includes a fuel cell FC, an air supply path 10, a compressor 11, an inlet valve 12, a bypass valve 13, an air discharge path 20, an outlet valve 21, a hydrogen supply path 30, a hydrogen tank 31, a hydrogen valve 32, an injector 33, a hydrogen circulation path 40, a circulation pump 41, a hydrogen discharge path 50, an exhaust valve 51, a controller 60, and a voltage sensor VS.

In this embodiment, as one example, a fuel cell system to be applied to a fuel cell automobile will be explained. The fuel cell automobile drives a motor by electricity generated by the fuel cell FC and travels. Note that the fuel cell system according to the first embodiment is not limited to being applied to fuel cell automobiles and may be applied to other applications.

The fuel cell FC, which is a solid polymer electrolyte type fuel cell, includes a cell stack in which a number of unit cells are stacked. Each unit cell includes a Membrane/Electrode Assembly (MEA) in which a polymer electrolyte membrane is interposed between an anode electrode and a cathode electrode and a pair of separators between which the MEA is interposed. The fuel cell FC generates power through an oxidation-reduction reaction of oxygen gas in air supplied via the separator on the cathode side and hydrogen gas supplied via the separator on the anode side.

Specifically, the oxidation reaction shown in Expression (1) occurs in the anode electrode, and the reduction reaction shown in Expression (2) occurs in the cathode electrode. Further, the chemical reaction shown in Expression (3) occurs in the entire fuel cell FC.

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

As shown in FIG. 1, the voltage sensor VS that measures the cell voltage is attached to the fuel cell FC. The cell voltage measured by the voltage sensor VS is input to the controller 60. The voltage of the fuel cell FC, that is, the voltage of the entire cell stack (hereinafter this voltage will be referred to as an FC voltage), is measured by the voltage sensor VS, although it is not specifically limited.

The air supply path 10 is a gas pipe for supplying air, which is oxidation gas (cathode gas), to the cathode electrode of the fuel cell FC. That is, the air supply path 10 is connected to an air inflow port of the cathode electrode in the fuel cell FC.

The compressor 11 is provided on the air supply path 10. The compressor 11 compresses air (AIR_IN) which has been taken in from outside of the system and supplies the compressed air to the cathode electrode of the fuel cell FC. Driving and stopping of the compressor 11, the number of rotations and the like are controlled by the controller 60.

The inlet valve 12 is provided on the air supply path 10. That is, the inlet valve 12 is connected to the air inflow port of the cathode electrode in the fuel cell FC. The air compressed by the compressor 11 is supplied to the cathode electrode of the fuel cell FC via the inlet valve 12. Opening and closing of the inlet valve 12 are controlled by the controller 60.

The inlet valve 12 may not be provided in the fuel cell system according to this embodiment.

The bypass valve 13 is provided on a bypass path that short-circuits the air supply path 10 and the air discharge path 20. By opening the bypass valve 13, a part or all of the air compressed by the compressor 11 can be made to flow through the air discharge path 20, not to the fuel cell FC. Opening and closing of the bypass valve 13 are controlled by the controller 60.

The bypass valve 13 and the bypass path may not be provided in the fuel cell system according to this embodiment.

The air discharge path 20 is a gas pipe for discharging air after the reaction from the cathode electrode of the fuel cell FC. That is, the air discharge path 20 is connected to an air discharge port of the cathode electrode in the fuel cell FC.

The outlet valve 21 is provided on the air discharge path 20. That is, the outlet valve 21 is connected to the air discharge port of the cathode electrode in the fuel cell FC. The outlet valve 21 is also referred to as a pressure regulating valve, and the air pressure (cathode pressure) in the fuel cell FC is adjusted by the outlet valve 21. The air (AIR_OUT) that has passed the outlet valve 21 is released to the outside of the system. Opening and closing of the outlet valve 21 are controlled by the controller 60.

The hydrogen supply path 30 is a gas pipe for supplying the hydrogen gas, which is the fuel gas (anode gas), to the anode electrode of the fuel cell FC. That is, the hydrogen supply path 30 is connected to a hydrogen inflow port of the anode electrode in the fuel cell FC.

The hydrogen tank 31 is provided at the end of the hydrogen supply path 30. The hydrogen tank 31 stores, for example, high-pressure hydrogen gas. The high-pressure hydrogen gas is depressurized by the hydrogen valve 32 provided on the hydrogen supply path 30. The depressurized hydrogen gas is then supplied to the anode electrode of the fuel cell FC via the injector 33. The pressure of the hydrogen gas in the fuel cell FC (anode gas pressure) is adjusted by opening or closing the injector 33. Opening and closing of each of the hydrogen valve 32 and the injector 33 are controlled by the controller 60.

The hydrogen circulation path 40 is a gas pipe for returning the hydrogen gas discharged from the anode electrode of the fuel cell FC to the hydrogen supply path 30 provided in the downstream of the injector 33. That is, by the hydrogen circulation path 40, the hydrogen gas discharged from the hydrogen discharge port of the anode electrode in the fuel cell FC returns to the hydrogen inflow port of the anode electrode.

The circulation pump 41 is provided on the hydrogen circulation path 40. The circulation pump 41 pressurizes the hydrogen gas discharged from the anode electrode of the fuel cell FC and returns the pressurized hydrogen gas to the anode electrode. Driving and stopping, and the number of rotations and the like of the circulation pump 41 are controlled by the controller 60.

The hydrogen discharge path 50 is a gas pipe for discharging hydrogen gas whose concentration has been decreased from the hydrogen circulation path 40. The hydrogen discharge path 50 is provided with the exhaust valve 51. The hydrogen discharge path 50 is connected to the air discharge path 20 in such a way that the hydrogen gas discharged from the hydrogen circulation path 40 via the exhaust valve 51 is not directly released to the outside of the system. Opening and closing of the exhaust valve 51 are controlled by the controller 60.

The controller 60 controls operations of various devices in the fuel cell system. That is, the controller 60 controls power generation of the fuel cell FC.

In particular, in the fuel cell system according to this embodiment, in a case of removing a component that allows air to enter the cathode electrode of the fuel cell FC when the component is removed, before this component is removed, the controller 60 executes the following steps.

When the component is removed, as a matter of course, power generation in the fuel cell FC is stopped. Therefore, the compressor 11 and the circulation pump 41 are stopped. Further, the inlet valve 12, the bypass valve 13, the outlet valve 21, the hydrogen valve 32, the injector 33, and the exhaust valve 51 are all closed.

The steps executed by the controller 60 will be explained.

First, the controller 60 opens the inlet valve 12 and the outlet valve 21, drives the compressor 11, and supplies air to the cathode electrode of the fuel cell FC (first step). By the first step alone, the hydrogen gas that has remained inside the anode electrode of the fuel cell FC is consumed since it reacts with the supplied air.

Further, the controller 60 drives the circulation pump 41 in a state in which the hydrogen gas is not supplied to the anode electrode of the fuel cell FC from the injector 33 to cause the hydrogen gas that remains inside the anode electrode of the fuel cell FC and the hydrogen circulation path 40 to be circulated (second step). According to the first step and the second step, hydrogen gas that remains not only inside the anode electrode of the fuel cell FC but also inside the hydrogen circulation path 40 and the hydrogen supply path 30 which is provided in the downstream of a joint position of the hydrogen circulation path 40 is also consumed since it reacts with the supplied air.

As described above, the controller 60 executes the first step and the second step, whereby substantially all the hydrogen that remains in the anode electrode of the fuel cell FC, the hydrogen circulation path 40 and the like is consumed. Therefore, even when the component is removed and air enters the cathode electrode of the fuel cell FC, it is possible to prevent the voltage of the fuel cell from increasing again. Accordingly, it is possible to ensure safety when the component is removed.

In the example shown in FIG. 1, when the component such as the inlet valve 12, the outlet valve 21, the fuel cell FC, the gas pipe that is provided between the inlet valve 12 and the fuel cell FC, and the gas pipe that is provided between the outlet valve 21 and the fuel cell FC is removed, air enters the cathode electrode of the fuel cell FC. Therefore, the controller 60 executes the first step and the second step.

On the other hand, even when the component such as the compressor 11, the bypass valve 13, a gas pipe that is provided in the upstream of the inlet valve 12, or a gas pipe that is provided in the downstream of the outlet valve 21 is removed, air does not enter the cathode electrode of the fuel cell FC. Therefore, the controller 60 does not need to execute the first step and the second step.

In a case in which the inlet valve 12 is not provided, air enters the cathode electrode of the fuel cell FC when the compressor 11 and the bypass valve 13 are removed as well. Therefore, the controller 60 executes the first step and the second step.

Method of Controlling Fuel Cell System

Figure 2:
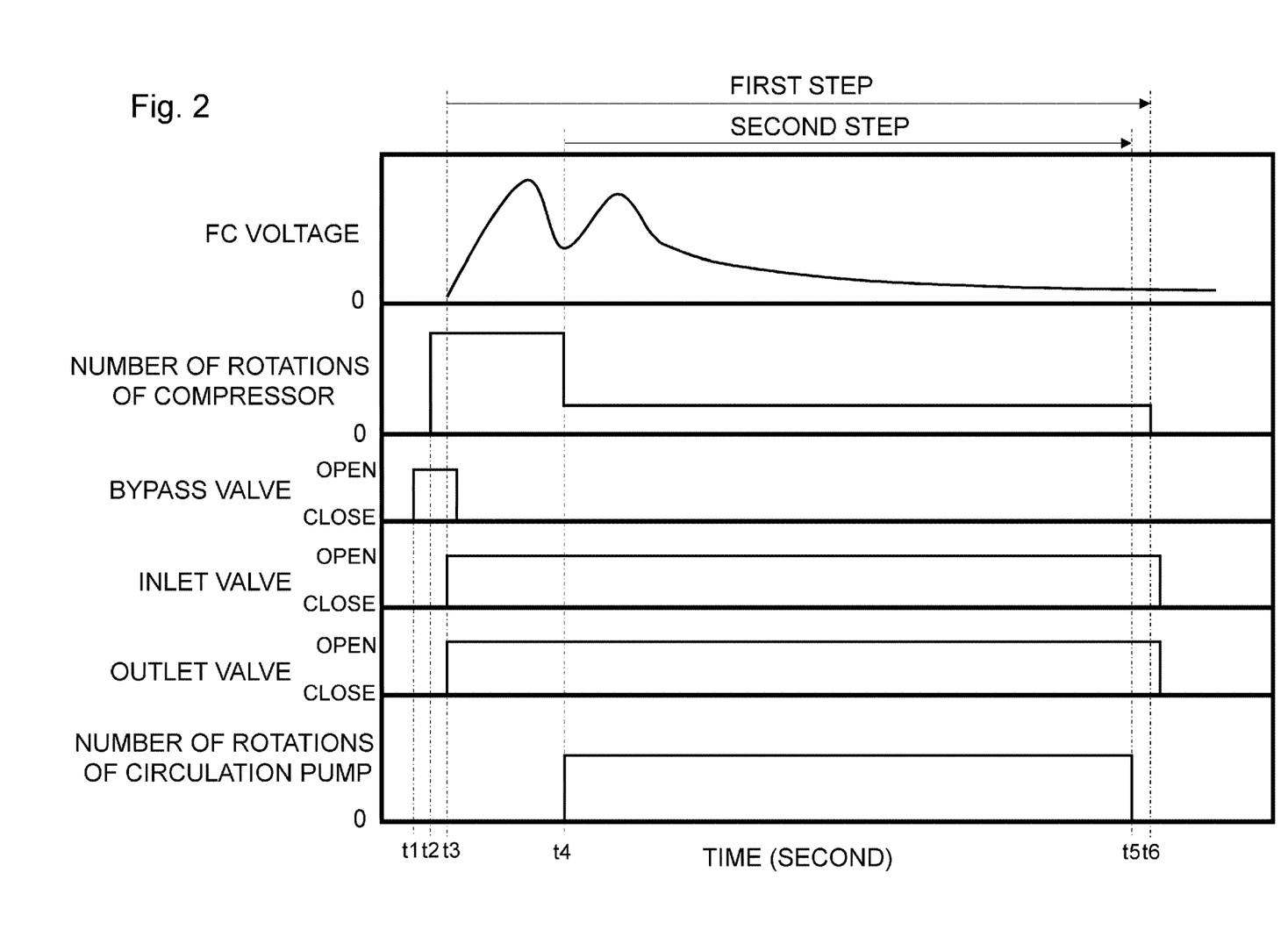
FIG. 2 is a timing chart showing a method of controlling the fuel cell system according to the first embodiment.

With reference next to FIG. 2, a method of controlling the fuel cell system according to the first embodiment will be explained. FIG. 2 is a timing chart showing the method of controlling the fuel cell system according to the first embodiment. Specifically, FIG. 2 shows operations of the respective devices in the fuel cell system in the above first step and the second step.

FIG. 2 shows, from top to bottom, changes over time of the FC voltage (V), the number of rotations (rpm) of the compressor 11, opening and closing of the bypass valve 13, opening and closing of the inlet valve 12, opening and closing of the outlet valve 21, and the number of rotations (rpm) of the circulation pump 41. The horizontal axis shown in FIG. 2 indicates time (s).

As described above, when the first step and the second step are executed, the power generation in the fuel cell FC is stopped. Therefore, the compressor 11 and the circulation pump 41 are stopped. Further, the inlet valve 12, the bypass valve 13, and the outlet valve 21 are all closed.

As shown in FIG. 2, first, at time t1, before the compressor 11 is driven, the bypass valve 13 is opened.

Next, at time t2, the compressor 11 is driven.

Then, at time t3, the inlet valve 12 and the outlet valve 21 are opened, and then the bypass valve 13 is closed.

According to the series of operations, air is supplied to the cathode electrode of the fuel cell FC from the compressor 11 (first step). At time t3, the first step is started.

As shown in FIG. 2, when the first step is started at time t3, hydrogen gas that has remained inside the anode electrode of the fuel cell FC reacts with air supplied to the anode electrode of the fuel cell FC. That is, since the fuel cell FC generates power, the FC voltage temporarily increases. When the hydrogen gas that has remained inside the anode electrode of the fuel cell FC is consumed over time, the FC voltage is reduced.

Next, in the example shown in FIG. 2, at time t4 at which the FC voltage is reduced, the circulation pump 41 is driven. Accordingly, the hydrogen gas that remains inside the anode electrode of the fuel cell FC and the hydrogen circulation path 40 is circulated (second step).

As shown in FIG. 2, the first step continues. That is, at time t4, in addition to the first step, the second step is also started. Accordingly, hydrogen gas that remains not only inside the anode electrode of the fuel cell FC but also inside the hydrogen circulation path 40 and the hydrogen supply path 30 which is provided in the downstream of the joint position of the hydrogen circulation path 40 is also consumed since it reacts with the supplied air.

As shown in FIG. 2, when the second step is started at time t4, the hydrogen gas that remains inside the hydrogen circulation path 40 and the like is supplied to the anode electrode of the fuel cell FC, and this hydrogen gas reacts with the air supplied to the cathode electrode of the fuel cell FC. That is, since the fuel cell FC generates power, the FC voltage temporarily increases again. When the hydrogen gas that has remained inside the anode electrode of the fuel cell FC is consumed over time, the FC voltage is reduced.

In the example shown in FIG. 2, at time t4, the circulation pump 41 starts to be driven, and at the same time the number of rotations of the compressor 11 is reduced. It is therefore possible to level the power consumption before and after the circulation pump 41 is driven.

Next, at time t5 at which the FC voltage is sufficiently reduced, the circulation pump 41 is stopped. That is, the second step is ended.

Next, at time t6, the compressor 11 is stopped. That is, the first step is ended. After that, the inlet valve 12 and the outlet valve 21 are closed.

Note that the circulation pump 41 and the compressor 11 may be concurrently stopped. Alternatively, the circulation pump 41 may be stopped before the compressor 11 is stopped.

By executing the first step and the second step as described above, substantially all the hydrogen that remains in the anode electrode of the fuel cell FC, the hydrogen circulation path 40 and the like is consumed. Therefore, even when the component is removed and air enters the cathode electrode of the fuel cell FC, it is possible to prevent the voltage of the fuel cell from increasing again. Accordingly, it is possible to ensure safety when the component is removed.

In this embodiment, the second step is started after a predetermined period of time has elapsed since the start of the first step. Accordingly, the peak value of the FC voltage when the first step and the second step are executed can be reduced. However, the first step and the second step may be concurrently started or the first step may be started after the second step is started.

Further, while the controller 60 executes the first step and the second step when the component is removed in this embodiment, an operator may, not the controller 60, execute the above steps. That is, the operator may operate driving and stopping of the compressor 11 and the circulation pump 41, opening and closing of the inlet valve 12 and the outlet valve 21 and the like.

Second Embodiment

Configuration of Fuel Cell System

Figure 3:
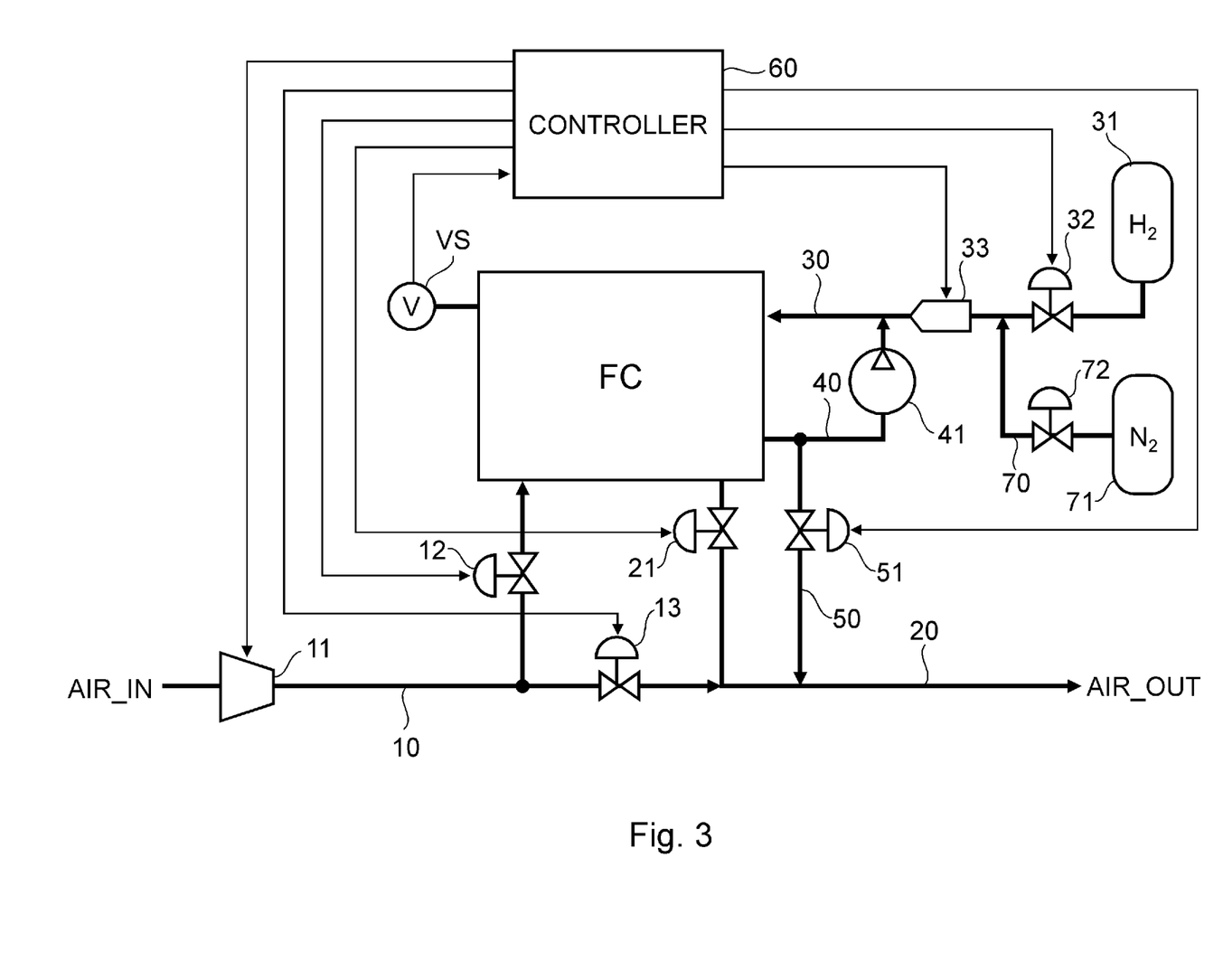
FIG. 3 is a configuration diagram of a fuel cell system according to a second embodiment.

Referring next to FIG. 3, a configuration of a fuel cell system according to the second embodiment will be explained. FIG. 3 is a configuration diagram of the fuel cell system according to the second embodiment. As shown in FIG. 3, the fuel cell system according to the second embodiment includes, besides the components included in the fuel cell system according to the first embodiment shown in FIG. 1, a nitrogen supply path 70, a nitrogen tank 71, and a nitrogen valve 72. In the case of the fuel cell automobile, for example, the nitrogen supply path 70, the nitrogen tank 71, and the nitrogen valve 72 may not be mounted on the fuel cell automobile and may be temporarily attached when the above component is removed.

The nitrogen supply path 70 is a gas pipe for supplying nitrogen gas ($N_2$ gas), which is inactive gas, to the anode electrode of the fuel cell FC via the injector 33. The nitrogen supply path 70 is connected to the hydrogen supply path 30 between the hydrogen valve 32 and the injector 33.

The nitrogen tank 71 is provided at the end of the nitrogen supply path 70. The nitrogen tank 71 stores, for example, a high-pressure nitrogen gas. The high-pressure nitrogen gas is depressurized by the nitrogen valve 72 provided on the nitrogen supply path 70. The depressurized nitrogen gas is supplied to the anode electrode of the fuel cell FC via the injector 33.

In the fuel cell system according to the second embodiment, in the second step, nitrogen gas, which is inactive gas, is supplied to the anode electrode of the fuel cell FC via the injector 33. That is, the nitrogen gas is supplied to the anode electrode of the fuel cell FC while causing the hydrogen gas that remains inside the anode electrode of the fuel cell FC and the hydrogen circulation path 40 to be circulated. At this time, the exhaust valve 51 is opened, and the hydrogen gas is discharged along with the nitrogen gas via the exhaust valve 51.

The other configurations are similar to those in the fuel cell system according to the first embodiment.

In the fuel cell system according to the second embodiment, like in the fuel cell system according to the first embodiment, the controller 60 executes the first step and the second step. Accordingly, substantially all the hydrogen that remains in the anode electrode of the fuel cell FC, the hydrogen circulation path 40 and the like is consumed. Therefore, even when the component is removed and air enters the cathode electrode of the fuel cell FC, it is possible to prevent the voltage of the fuel cell from increasing again. Accordingly, it is possible to ensure safety when the component is removed.

Further, in the fuel cell system according to the second embodiment, in the second step, the hydrogen gas is discharged along with the nitrogen gas via the exhaust valve 51 while supplying the nitrogen gas to the anode electrode of the fuel cell FC via the injector 33. Therefore, the time required to consume hydrogen that remains in the anode electrode of the fuel cell FC, the hydrogen circulation path 40 and the like can be further reduced compared to that in the fuel cell system according to the first embodiment. As a result, it is possible to reduce the time required to start removing the component.

Further, in the fuel cell system according to the second embodiment, hydrogen gas that remains inside the hydrogen supply path 30 from the joint position of the hydrogen circulation path 40 to the injector 33 can also be introduced into the anode electrode of the fuel cell FC by introduction of nitrogen. It is therefore possible to definitely prevent the voltage of the fuel cell from increasing again when the component is removed.

Method of Controlling Fuel Cell System

Figure 4:
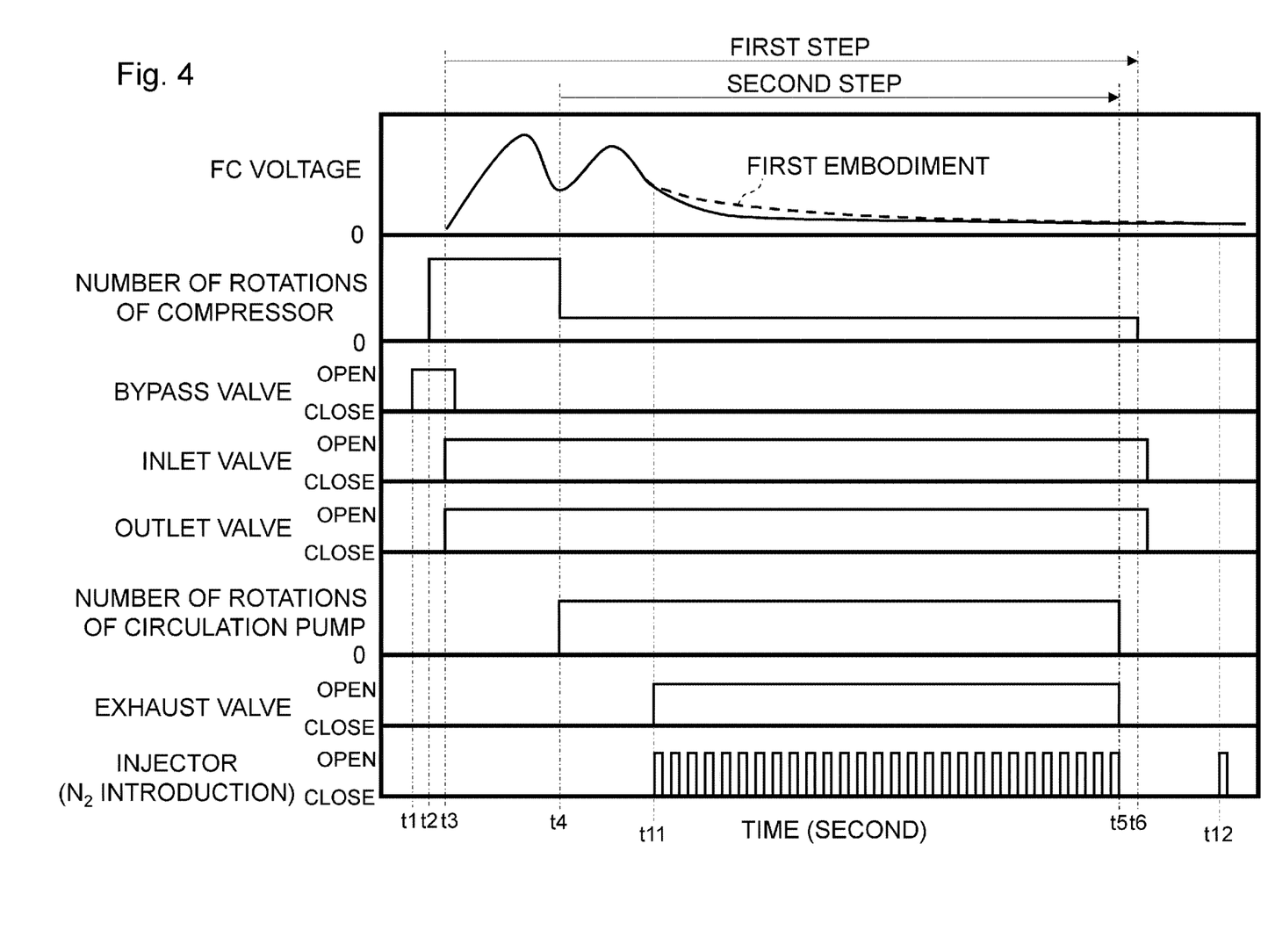
FIG. 4 is a timing chart showing a method of controlling the fuel cell system according to the second embodiment.

Referring next to FIG. 4, a method of controlling the fuel cell system according to the second embodiment will be explained. FIG. 4 is a timing chart showing the method of controlling the fuel cell system according to the second embodiment. Specifically, FIG. 4 shows operations of the respective devices in the fuel cell system in the first step and the second step stated above.

FIG. 4 shows, from top to bottom, changes over time of the FC voltage (V), the number of rotations (rpm) of the compressor 11, opening and closing of the bypass valve 13, opening and closing of the inlet valve 12, opening and closing of the outlet valve 21, and the number of rotations (rpm) of the circulation pump 41 shown in FIG. 2. Among them, the changes over time of the items other than the FC voltage (V) are the same as those shown in FIG. 2. FIG. 4 further shows changes over time of opening and closing of the exhaust valve 51, opening and closing of the injector 33 below the number of rotations of the circulation pump 41.

Since the operations to time t4 at which the second step is started in FIG. 4 are similar to those shown in FIG. 2, the descriptions thereof will be omitted.

As shown in FIG. 4, in the fuel cell system according to the second embodiment, after the second step is started, from time t11 to time t5 at which the second step is executed, the injector 33 is intermittently opened, and at the same time the exhaust valve 51 is kept to be opened. That is, the hydrogen gas is discharged along with the nitrogen gas via the exhaust valve 51 while intermittently introducing nitrogen gas from the injector 33.

As shown in FIG. 4, when the second step is started at time t4, the hydrogen gas that remains inside the hydrogen circulation path 40 and the like is supplied to the anode electrode of the fuel cell FC and reacts with air supplied to the cathode electrode of the fuel cell FC. That is, since the fuel cell FC generates power, the FC voltage temporarily increases again. When the hydrogen gas that has remained inside the anode electrode of the fuel cell FC is consumed over time, the FC voltage is reduced.

As shown in FIG. 4, in the fuel cell system according to the second embodiment, at time t11 and after time t11, the hydrogen gas is discharged along with the nitrogen gas via the exhaust valve 51 while intermittently introducing nitrogen gas from the injector 33. Therefore, compared to the fuel cell system according to the first embodiment, the time required to consume hydrogen that remains in the anode electrode of the fuel cell FC, the hydrogen circulation path 40 and the like can be reduced. Therefore, as shown by the dashed line in FIG. 4, the FC voltage is reduced faster than it is reduced in the fuel cell system according to the first embodiment. As a result, it is possible to reduce the time required to start removing the component.

Further, in the example shown in FIG. 4, after the first step and the second step are ended, at time t12, nitrogen gas is introduced from the injector 33 for only a short period of time, and it is confirmed that the FC voltage does not increase again.

The other configurations are similar to those of the method of controlling the fuel cell system according to the first embodiment.

In this embodiment, the introduction of the nitrogen gas is started after a predetermined period of time has elapsed since the start of the second step. However, the introduction of the nitrogen gas may be started at the same time that the second step is started. Further, in this embodiment, at the same time that the second step is ended, the introduction of the nitrogen gas is ended. However, the introduction of the nitrogen gas may be ended before the second step is ended.

Third Embodiment

Configuration of Fuel Cell System

Figure 5:
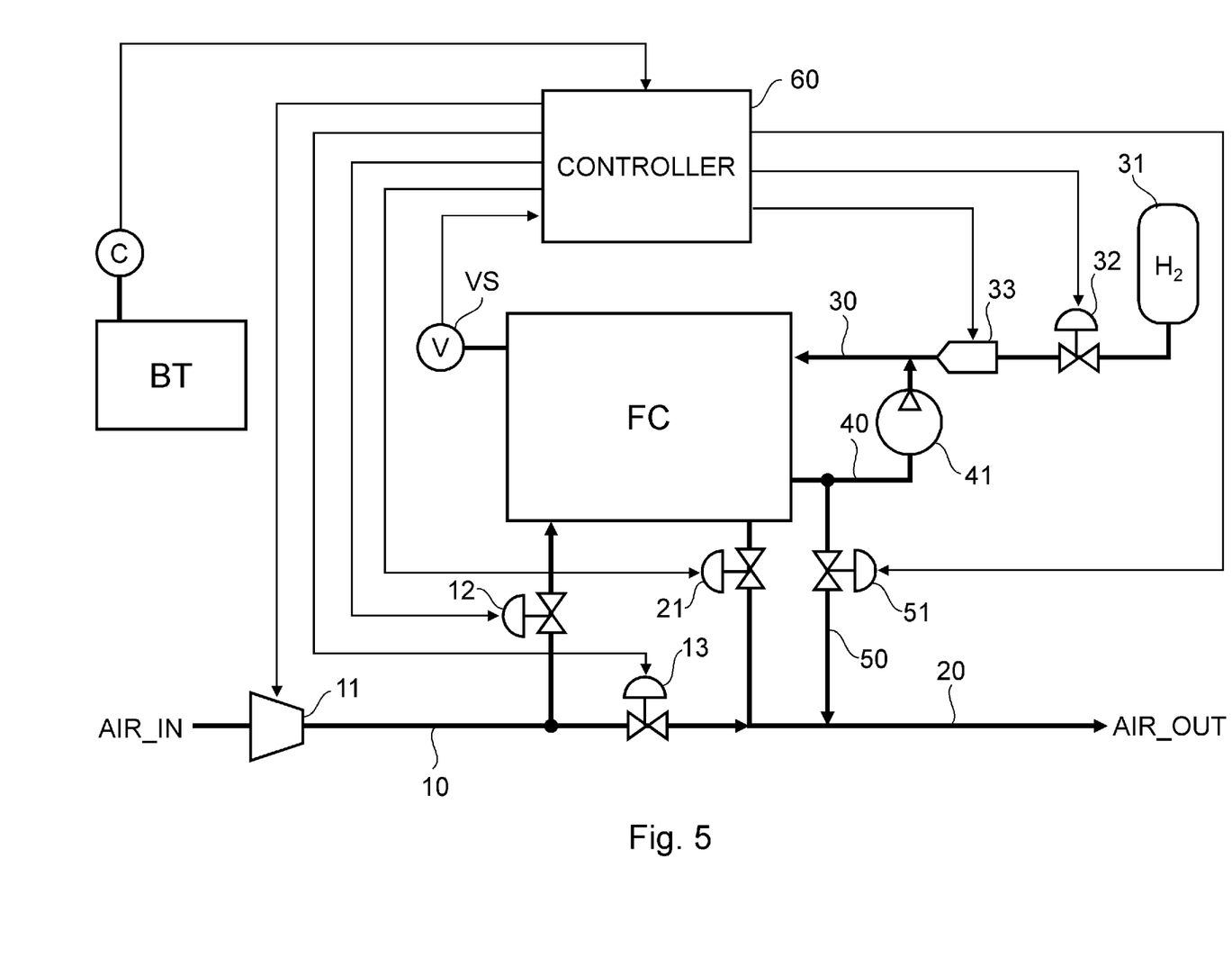
FIG. 5 is a configuration diagram of a fuel cell system according to a third embodiment.

Referring next to FIG. 5, a configuration of a fuel cell system according to a third embodiment will be explained. FIG. 5 is a configuration diagram of the fuel cell system according to the third embodiment. As shown in FIG. 5, the fuel cell system according to the third embodiment includes, besides the components included in the fuel cell system according to the first embodiment shown in FIG. 1, a secondary cell BT and a charge amount measurement device C.

The fuel cell system according to the third embodiment may include the nitrogen supply path 70, the nitrogen tank 71, and the nitrogen valve 72 shown in FIG. 3.

The secondary cell BT supplies power to the compressor 11 and the circulation pump 41 while the power generation in the fuel cell FC is being stopped.

The charge amount measurement device C, which is, for example, a remaining battery meter, measures a charge amount of the secondary cell BT. The charge amount to be measured is, for example, a State Of Charge (SOC), but it is not limited thereto. The charge amount of the secondary cell BT measured by the charge amount measurement device C is input to the controller 60.

The other configurations are similar to those of the fuel cell system according to the first embodiment.

In the fuel cell system according to the third embodiment, when the charge amount of the secondary cell BT measured by the charge amount measurement device C is smaller than a predetermined reference value, the controller 60 does not execute the first step and the second step. It is therefore possible to prevent the charge amount of the secondary cell BT from being excessively reduced while the power generation in the fuel cell FC is being stopped.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell system comprising:
    a fuel cell configured to generate power through a reaction of air supplied to a cathode electrode and hydrogen gas supplied to an anode electrode;
    a compressor configured to supply air to the cathode electrode of the fuel cell;
    an outlet valve connected to a discharge port through which air is discharged from the cathode electrode;
    an injector configured to supply hydrogen gas to the anode electrode of the fuel cell;
    a circulation pump provided in a circulation path that returns the hydrogen gas discharged from the anode electrode to the anode electrode; and
    a controller programmed to control power generation of the fuel cell, wherein
    before a component that allows air to enter the cathode electrode when the component is removed,
    the controller is programmed to execute the following steps:
    a first step of opening the outlet valve, driving the compressor, and supplying air to the cathode electrode; and
    a second step of driving the circulation pump to cause hydrogen gas that remains inside the anode electrode and the circulation path to be circulated in a state in which the hydrogen gas is not supplied to the anode electrode from the injector.

2. The fuel cell system according to claim 1, wherein execution of the second step is started after a predetermined period of time has elapsed since the start of the execution of the first step.

3. The fuel cell system according to claim 2, wherein the number of rotations of the compressor that is driven in the first step is reduced when the circulation pump is driven in the second step.

4. The fuel cell system according to claim 1, further comprising an exhaust valve configured to discharge hydrogen gas discharged from the anode electrode,
    wherein when the second step is executed, inactive gas is discharged via the exhaust valve while the inactive gas is being supplied to the anode electrode via the injector.

5. The fuel cell system according to claim 1, further comprising:
    a secondary cell configured to supply power to the compressor and the circulation pump; and
    a measurement device configured to measure a charge amount of the secondary cell,
    wherein the controller does not execute the first step and the second step when the charge amount of the secondary cell measured by the measurement device is smaller than a predetermined reference value.

6. A method of controlling a fuel cell system comprising:
    a fuel cell configured to generate power through a reaction of air supplied to a cathode electrode and hydrogen gas supplied to an anode electrode;
    a compressor configured to supply air to the cathode electrode of the fuel cell;
    an outlet valve connected to a discharge port through which air is discharged from the cathode electrode;
    an injector configured to supply hydrogen gas to the anode electrode of the fuel cell; and
    a circulation pump provided in a circulation path that returns the hydrogen gas discharged from the anode electrode to the anode electrode, wherein the method comprises executing, before a component that allows air to enter the cathode electrode when the component is removed,
    a first step of opening the outlet valve, driving the compressor, and supplying air to the cathode electrode; and
    a second step of driving the circulation pump to cause hydrogen gas that remains inside the anode electrode and the circulation path to be circulated in a state in which the hydrogen gas is not supplied to the anode electrode from the injector.

* * * * *